United States Patent
Nonami

(10) Patent No.: US 7,174,162 B2
(45) Date of Patent: Feb. 6, 2007

(54) PORTABLE RADIO COMMUNICATION APPARATUS

(75) Inventor: Takayuki Nonami, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 832 days.

(21) Appl. No.: 09/799,114

(22) Filed: Mar. 6, 2001

(65) Prior Publication Data

US 2001/0009862 A1  Jul. 26, 2001

Related U.S. Application Data

(62) Division of application No. 08/502,204, filed on Jul. 13, 1995, now Pat. No. 6,226,500.

(30) Foreign Application Priority Data

Jul. 19, 1994  (JP) .................................. 6-167147

(51) Int. Cl.
    *H04Q 7/22*  (2006.01)
(52) U.S. Cl. .............................. 455/412.1; 455/412.2; 455/415; 455/566
(58) Field of Classification Search ........ 455/566–567, 455/575, 90.3, 89, 575.1, 412, 415, 413, 455/407, 412.1, 412.2, 416, 514, 67.7, 70, 455/72; 379/142.02–142.07, 127.01, 58–61, 379/67, 88, 142
See application file for complete search history.

(56) References Cited

U.S. PATENT DOCUMENTS

| | | | |
|---|---|---|---|
| 4,644,351 A | * | 2/1987 | Zabarsky et al. .......... 340/7.21 |
| 4,845,491 A | * | 7/1989 | Fascenda et al. .......... 340/7.47 |
| 4,870,402 A | | 9/1989 | DeLuca et al. |
| 4,872,005 A | | 10/1989 | DeLuca et al. |
| 4,994,797 A | | 2/1991 | Breeden |
| 5,003,576 A | | 3/1991 | Helferich |
| 5,058,150 A | | 10/1991 | Kang |
| 5,099,507 A | * | 3/1992 | Mukai et al. ................. 340/7.1 |
| 5,159,713 A | * | 10/1992 | Gaskill et al. .............. 455/344 |
| 5,237,592 A | * | 8/1993 | Nonami ...................... 375/354 |

(Continued)

FOREIGN PATENT DOCUMENTS

CH    681398 A5    3/1993

(Continued)

OTHER PUBLICATIONS

European digital cellular telecommunication system (phase 1); Technical Realization of the Short Message Service—Point-to-Point, Technical Specification No. GSM 03,04, version 3.5.0, 1992, pp. 1, 7 and 10, European Telecommunications Standards Institute, France.

*Primary Examiner*—Pablo N. Tran
(74) *Attorney, Agent, or Firm*—Rothwell Figg Ernst & Manbeck

(57) ABSTRACT

The present invention aims at providing a portable radio communication apparatus in which forming of a message is easy. The portable radio communication apparatus is provided with a novel pre-message memory formed of a ROM or the like stored in which are fixed messages each consisting of fixed statements or fixed words as "CALL OFFICE AT XX:XX". A transmitting message may be readily formed by selecting any of the fixed messages.

4 Claims, 20 Drawing Sheets

U.S. PATENT DOCUMENTS

| | | | |
|---|---|---|---|
| 5,351,235 A | 9/1994 | Lahtinen | |
| 5,461,663 A * | 10/1995 | Motegi | 340/7.55 |
| 5,526,398 A | 6/1996 | Okada et al. | |
| 5,734,696 A * | 3/1998 | Day | 379/9.06 |
| 5,739,762 A * | 4/1998 | Kuramatsu et al. | 340/825.21 |
| 6,011,955 A * | 1/2000 | Tsuchiyama | 340/7.1 |
| 6,226,500 B1 * | 5/2001 | Nonami | 455/91 |
| 6,347,225 B1 * | 2/2002 | Nishiyama | 455/412.1 |

FOREIGN PATENT DOCUMENTS

| | | |
|---|---|---|
| DE | 42 07 664 A1 | 9/1993 |
| DE | 43 40 679 A1 | 6/1995 |
| EP | 0 341 609 A2 | 11/1989 |
| EP | 528376 A1 * | 2/1993 |
| EP | 0 574 006 A1 | 12/1993 |
| EP | 821328 A2 * | 1/1998 |
| GB | 2 283 597 A | 5/1995 |
| JP | 01162434 A * | 6/1989 |
| JP | 03018137 A | 1/1991 |
| JP | 03169145 A * | 7/1991 |
| JP | 03283864 A | 12/1991 |
| JP | 06006303 A * | 1/1994 |
| WO | WO 95/02305 A1 | 1/1995 |

\* cited by examiner

PORTABLE RADIO COMMUNICATION APPARATUS

BACKGROUND OF THE INVENTION

1. Field of the Invention

The present invention relates to portable radio communication apparatus such as a digital mobile phone having a two-way message transmitting/receiving function for use mainly in the filed of mobile communication.

2. Description of the Related Art

As an additional function for mobile phones, the SMS (Short Message Service) transmitting function in two-way message transmission is specified in GSM03.40 of GSM (Global System for Mobile communications) standard of the digital mobile phone standard which constitutes one of the European Telecommunications Standards (ETS). The SMS functions to transmit a message of a maximum of 160 characters through a wireless circuit in opposite directions.

Construction of a conventional portable radio communication apparatus will be described below with reference to FIGS. 19 and 20. FIG. 19 is a block diagram showing the construction of a portable radio communication apparatus having a conventional two-way message transmitting function. FIG. 20 is a front view showing an external appearance of the portable radio communication apparatus of FIG. 19.

Referring to FIG. 19, the apparatus includes: an antenna 1 for transmitting/receiving a radio frequency signal; a radio section 2 for effecting a frequency conversion to a radio frequency or, for example, to an intermediate frequency; a modulator-demodulator section 3 operating for example in GMSK (Gaussian Filtered Minimum Shift Keying) modulating/demodulating method; a control section 4 having such as CPU, ROM, RAM for controlling the apparatus as a whole; a message memory 5 such as of RAM for temporarily storing a transmitting/received message; an operation section 6; a display section 7 such as of liquid crystal; a sound processing section 8; a microphone 9; and a speaker 10.

In FIG. 20, Numerals 6a, 6b and 6c denote a function key section, a 10-key section and a volume key, respectively.

Further, in FIG. 20, the function key section 6a includes: PWR key for performing switching on/off of power supply; STO key serving as a registering key for abbreviated dialing phone numbers; FCN key serving as a function key capable of calling various functions by a combination with numeral keys; END key for terminating a communication; P key serving as "one-touch" dialing key for an instant originating of call to already registered phone numbers; RCL key serving as a calling key for abbreviated dialing phone numbers; CLR key serving as a clearing key; and SEND key serving as a transmitting/receiving key. The 10-key section 6b includes keys for Arabic numerals of 1, 2, 3, 9, 0, an asterisk (*) key and a sharp (#) key, the numeral keys and the like serving also as character keys (A, B, C,) as shown when operating in a character input mode. However, the numerical key "0" corresponds to an operator call and is incapable of character input.

Operation of the conventional radio communication apparatus will be described below. A received message signal of SMS enters the control section 4 for its decoding from the antenna 1 through the radio section 2 and modulator-demodulator section 3. It is then displayed as a message by the display section 7 and may be recorded at the message memory 5 by an operation of the operation section 6.

A transmitting message signal of SMS may be formed by inputting one character at a time by means of the 10-key section 6b using the alphabet of A, B, C at the 10-key section 6b while confirming it on the display section 7. Upon a transmitting operation (SEND key) at the operation section 6, the formed message is encoded at the control section 4 and is then transmitted from the antenna 1 through the modulator-demodulator section 3 and radio section 2.

In forming a transmitting message with the conventional portable radio communication apparatus as described above, it has been necessary to input one character at a time through the operation section 6. For this reason, there is a problem of inconvenience that inputting of one character at a time is required even for the messages which are formed by using identical words.

Another problem is that, since only the English alphabet is indicated on the operation section 6, inputting by other languages cannot be performed.

In receiving a message, there is a problem that, while the received message is read as it is displayed on the display section 7, it is difficult to be read if the number of characters that may be displayed on the display section 7 is small.

Further, if the receiving side is absent, a problem of inconvenience occurs in case of an emergency, since no response will be received by the party originating the message and no transfer will be made.

Furthermore, there is a problem that it is impossible to find out when the message was received or originated, since no function is provided for concurrently recording the time of receiving and originating at the time of receiving/transmitting a message.

SUMMARY OF THE INVENTION

To solve the above described problems, it is an object of the present invention to provide a portable radio communication apparatus in which a transmitting message may be readily formed.

It is another object of the present invention to provide a portable radio communication apparatus in which inputting by a language other than the English language is possible.

It is another object of the present invention to provide a portable radio communication apparatus in which the content of a received message may be easily perceived even when the number of characters that may be displayed on a display section is small.

It is another object of the present invention to provide a portable radio communication apparatus in which automatic answering or automatic transferring in case of users absence is possible.

It is another object of the present invention to provide a portable radio communication apparatus in which the time of originating/receiving a call is readily identified.

A portable radio communication apparatus according to the present invention comprises:

an antenna for transmitting/receiving a radio frequency message signal;

a radio/modulator-demodulator section for demodulating a received radio frequency message signal by converting its frequency and for modulating a transmitting message signal to effect its frequency conversion into a radio frequency;

a message memory for storing transmitting/received messages;

a display section for displaying the transmitting/received messages;

a pre-message memory for previously storing a plurality of fixed messages;

an operation section; and a control section for selecting one of the plurality of fixed messages stored in the pre-message memory by an operation of the operation section while causing it to be displayed on the display section to complete a desired message by adding another message thereto and for transmitting the desired message.

Accordingly, a desired message may be readily formed.

A portable radio communication apparatus according to the present invention comprises:

an antenna for transmitting/receiving a radio frequency message signal;

a radio/modulator-demodulator section for demodulating a received radio frequency message signal by converting its frequency and for modulating a transmitting message signal to effect its frequency conversion into a radio frequency;

a message memory for storing transmitting/received messages;

a display section for displaying the transmitting/received messages;

an alphabet memory for previously storing a plurality of alphabets of languages;

an operation section; and a control section for selecting and confirming one of the plurality of language names of the alphabets stored in the alphabet memory while displaying them on the display section by an operation of the operation section.

Accordingly, a language other than the English language may be used on the apparatus.

A portable radio communication apparatus according to the present invention comprises:

an antenna for transmitting/receiving a radio frequency message signal;

a radio/modulator-demodulator section for demodulating a received radio frequency message signal by converting its frequency and for modulating a transmitting message signal to effect its frequency conversion into a radio frequency;

a message memory for storing transmitting/received messages;

a display section for displaying the transmitting/received messages;

a message sound converting data memory for storing information necessary for a conversion into sound of a received message;

a sound processing section for outputting from a speaker the received message which has been converted into a sound;

an operation section; and a control section for selecting one of the received messages and for transferring it to the message sound converting data memory by an operation of the operation section.

Accordingly, the content of a received message may be readily perceived.

A portable radio communication apparatus according to the present invention comprises:

an antenna for transmitting/receiving a radio frequency message signal;

a radio/modulator-demodulator section for demodulating a received radio frequency message signal by converting its frequency and for modulating a transmitting message signal to effect its frequency conversion into a radio frequency;

a message memory for storing transmitting/received messages;

a display section for displaying the transmitting/received messages;

an automatic answering message memory for storing registered call originator IDs and response message corresponding to the IDs;

an operation section; and a control section for selecting an automatic answering in case of users absence by an operation of the operation section and for transmitting the answering message corresponding to a registered call originator ID when a match occurs between a call originator ID in the received message and the registered call originator ID in the automatic answering message memory.

Accordingly, it is possible in case of users absence to respond to the party at the other end of communication.

A portable radio communication apparatus according to the present invention comprises:

an antenna for transmitting/receiving a radio frequency message signal;

a radio/modulator-demodulator section for demodulating a received radio frequency message signal by converting its frequency and for modulating a transmitting message signal to effect its frequency conversion into a radio frequency;

a message memory for storing transmitting/received messages;

a display section for displaying the transmitting/received messages;

a timer section for measuring the current time; and a control section for concurrently storing as a reception time data the current time read out from the timer section when storing a received message to the message memory and for concurrently displaying the reception time data when displaying the received message on the display section.

Accordingly, it is easy to know the reception time of a received message.

DESCRIPTION OF THE PREFERRED EMBODIMENTS

Embodiment 1

Figure 1:
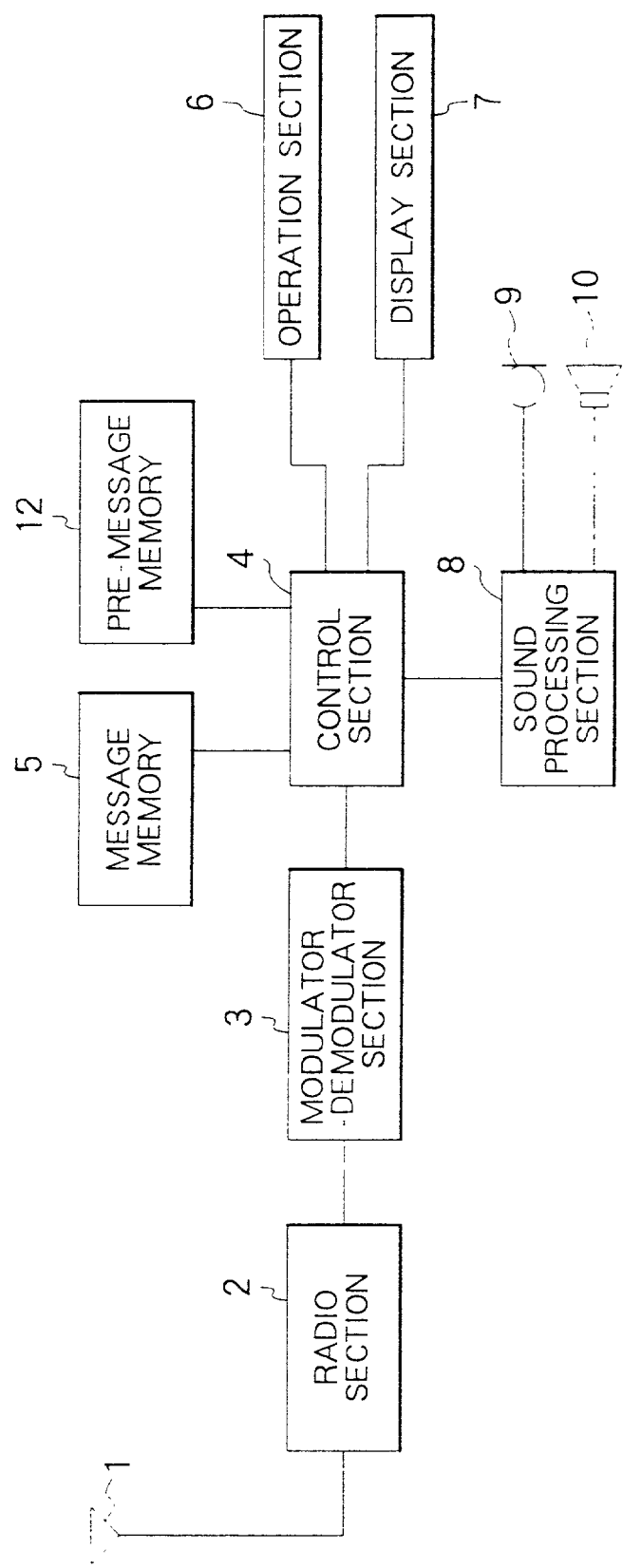
FIG. 1 is a block diagram showing the construction of a portable radio communication apparatus according to Embodiment 1 of the present invention.
Figure 20:
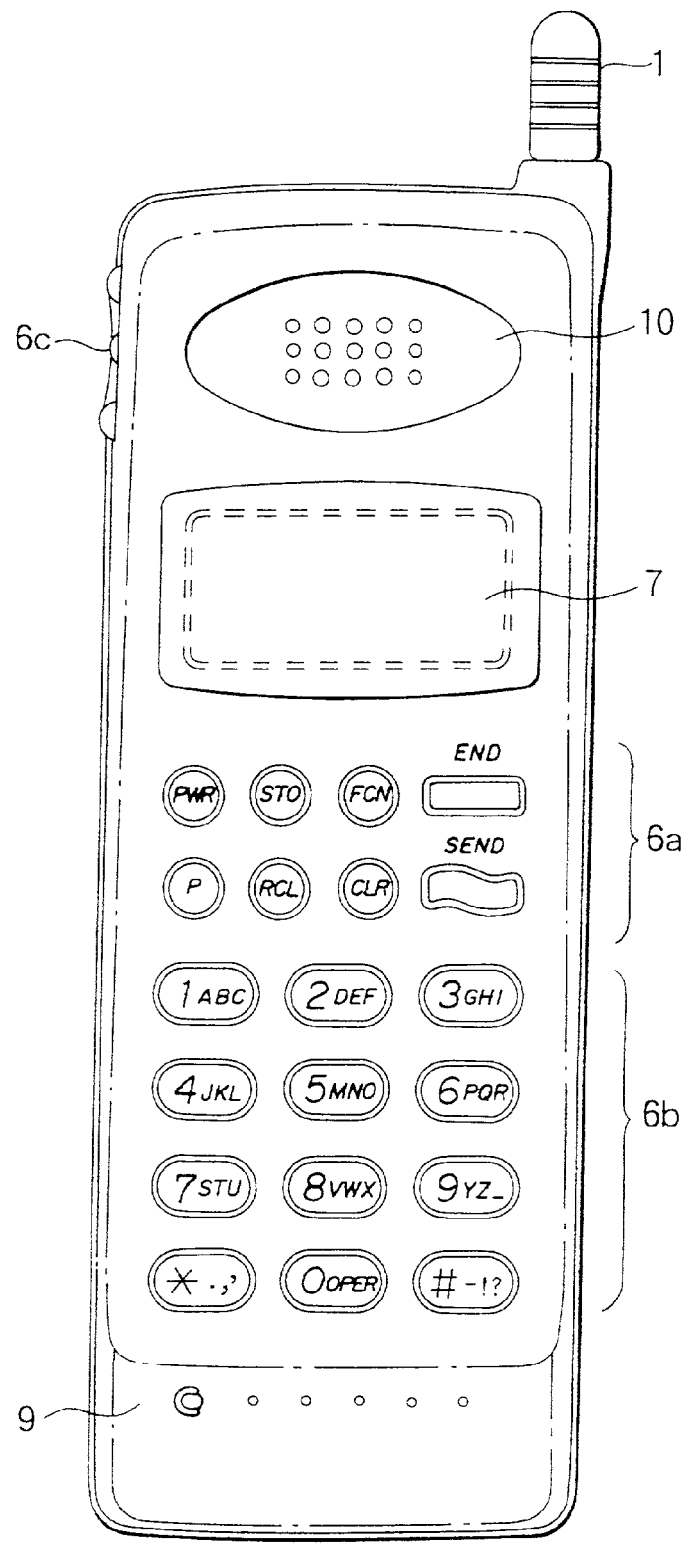
FIG. 20 is a front view showing the external appearance of a conventional portable radio communication apparatus.

The construction of Embodiment 1 of the present invention will be described below with reference to FIG. 1. FIG. 1 is a block diagram showing the construction of Embodiment 1 of the present invention. Here, the external appearance of the portable radio communication apparatus according to Embodiment 1 is substantially identical to the conventional apparatus as shown in FIG. 20. The same can be said with respect to all the embodiments hereinbelow. It should be noted that like numerals in the drawings denote like or corresponding component parts.

Referring to FIG. 1, a portable radio communication apparatus according to Embodiment 1 comprises: an antenna 1 for transmitting/receiving a radio frequency signal; a radio section 2 for effecting a frequency conversion into a radio frequency or, for example, into an intermediate frequency; a modulator-demodulator section 3 operating for example in GMSK modulating/demodulating method; a control section 4 having such as CPU, ROM, RAM for controlling the apparatus as a whole; a message memory 5 such as of RAM for temporarily storing transmitting/received messages; an operation section 6; a display section 7 such as of liquid crystal; a sound processing section 8; a microphone 9; a speaker 10; and a pre-message memory 12 for storing fixed messages.

The above operation section 6 includes a function key section 6*a*, a 10-key section 6*b* and a volume key 6*c*.

Further, the above described function key section 6*a* includes: PWR key for performing switching on/off of power supply; STO key serving as a registering key for abbreviated dialing phone numbers; FCN key serving as a function key capable of calling various functions by a combination with numeral keys; END key for terminating a communication; P key serving as "one-touch" dialing key for an instant originating of call to already registered phone numbers; RCL key serving as a calling key for abbreviated dialing phone numbers; CLR key serving as a clearing key; and SEND key serving as a transmitting/receiving key. The above described 10-key section 6*b* includes keys for the numerals of 1, 2, 3, 9, 0, an asterisk (*) key and a sharp (#) key, the numeric keys and the like serving also as character keys for an alphabet when operating in a character input mode.

The pre-message memory 12 comprises such as a ROM for previously storing fixed messages each consisting of fixed statement or fixed words such as "CALL OFFICE AT XX:XX".

In Embodiment 1, standardized messages consisting of fixed statements or fixed words which are frequently used in ordinary situations are previously stored in the pre-message memory 12. The user can readily form a desired message by a small number of times of key operation by selecting a fixed message while displaying it on the display section 7 by means of an operation of the operation section 6.

Figure 2:
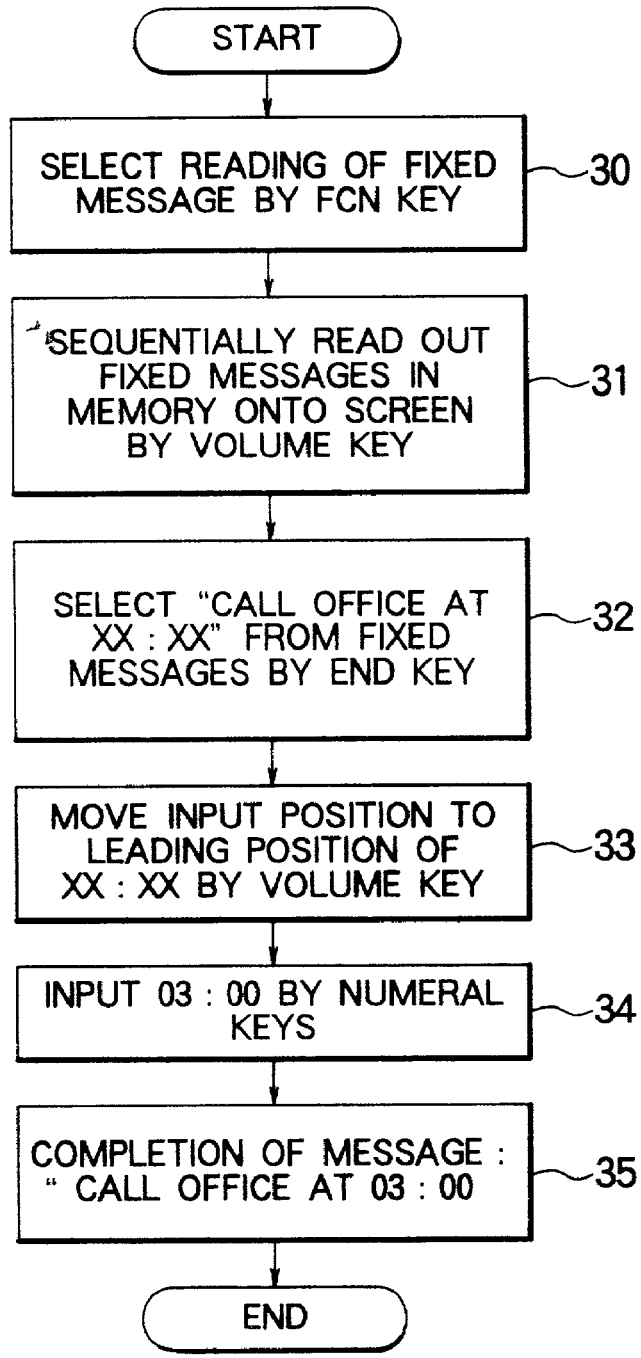
FIG. 2 is a flowchart showing the operation of Embodiment 1 of the present invention.

Operation of Embodiment 1 will be described below with reference to FIG. 2. It should be noted that, since its fundamental operation such as the two-way message transmitting/receiving operation is identical to the conventional apparatus and thus will not be described below. The same can be said to the other embodiments thereafter.

A case will be described below of forming and transmitting, for example, a transmitting message "CALL OFFICE AT 03:00".

At step 30, upon an operation of the FCN key in the operation section 6, the control section 4 selects "read fixed message" which effects a read-out of fixed messages from the pre-message memory 12. At step 31, the control section 4 sequentially reads out the fixed messages within the pre-message memory 12 to the screen of the display section 7 by an operation of the volume key 6*c* in the operation section 6.

At step 32, the control section 4 then selects "CALL OFFICE AT XX:XX" from the fixed messages upon an operation of the END key in the operation section 6. The control section 4 then at step 33 moves an input position (cursor position) to the leading position of XX:XX upon an operation of the volume key 6*c* in the operation section 6. The control section 4 at step 34 then inputs 03:00 to XX:XX by an operation of the numeral keys in the operation section. In this manner, a message "CALL OFFICE AT 03:00" is complete at step 35. The control section 4 then transmits this message by an operation of the SEND key in the operation section 6.

The portable radio communication apparatus according to Embodiment 1 has a two-way message transmitting/receiving function and, in addition, has the pre-message memory 12 in which a plurality of character strings are previously stored. Since any of the plurality of character strings may be selected and transmitted as a transmitting message as it is or in a partially added or corrected manner, it is possible to readily form a desired transmitting message.

Embodiment 2

Figure 3:
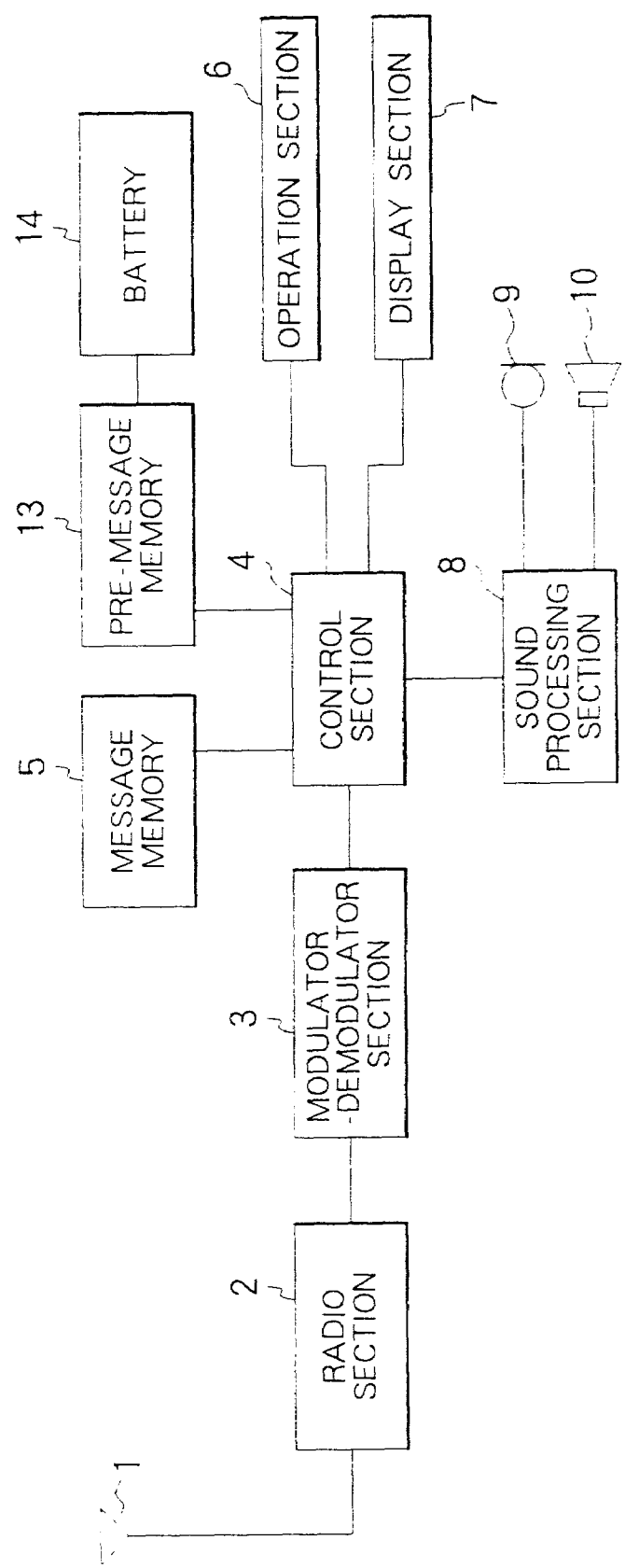
FIG. 3 is a block diagram showing the construction of a portable radio communication apparatus according to Embodiment 2 of the present invention.

The construction of Embodiment 2 of the present invention will now be described with reference to FIG. 3. FIG. 3 is a block diagram showing the construction of Embodiment 2 of the present invention.

Referring to FIG. 3, a portable radio communication apparatus according to Embodiment 2 comprises: an antenna 1; a radio section 2; a modulator-demodulator section 3; a control section 4; a message memory 5; an operation section 6; a display section 7; a sound processing section 8; a microphone 9; a speaker 10; and a pre-message memory 13 formed of a RAM capable of maintaining its content by means of a battery 14.

The above operation section 6 includes a function key section 6*a*, a 10-key section 6*b* and a volume key 6*c*.

By providing the above described pre-message memory 13, the user is able to form and register fixed messages (for example a name of company as "MELCO") of ones own in addition to the previously determined messages, by combining fixed statements or fixed words. A desired message may be formed more readily and with less number of times of key operation.

Figure 4:
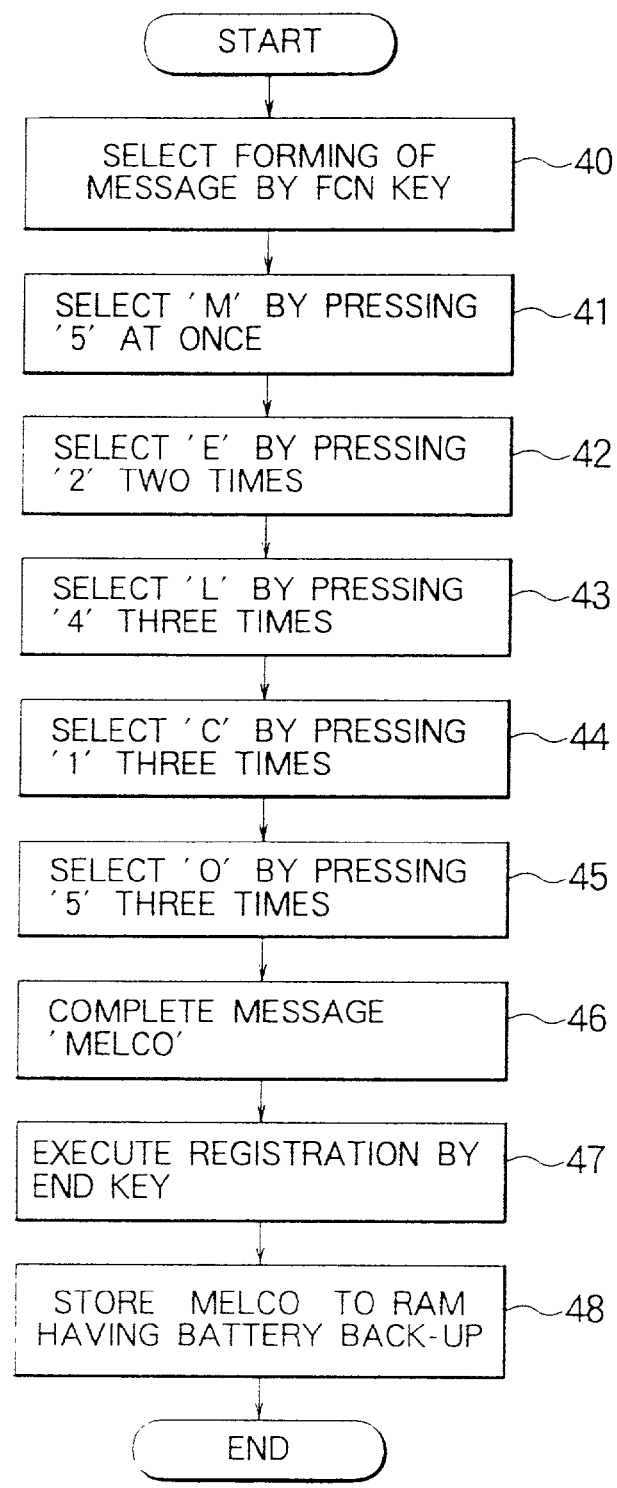
FIG. 4 is a flowchart showing the operation of Embodiment 2 of the present invention.

Operation of Embodiment 2 will now be described with reference to FIG. 4. A case will be described below for example of forming a message of the company name "MELCO".

At step 40, the control section 4 selects "message forming" upon an operation of FCN key. At step 41, when the numeral key "5" is pressed once, the control section 4 selects the character "M". Thereafter, at steps 42 to 45, the control section 4 selects: a character "E" when the numeral key "2" is pressed two times; a character "L" when the numeral key "4" is pressed three times; a character "C" when the numeral key "1" is pressed three times; and a character "O" when the numeral key "5" is pressed three times.

In steps 46 to 48, the message "MELCO" is complete and the control section 4 registers the message to the pre-message memory 13 by means of an operation of the END key.

Embodiment 3

Figure 5:
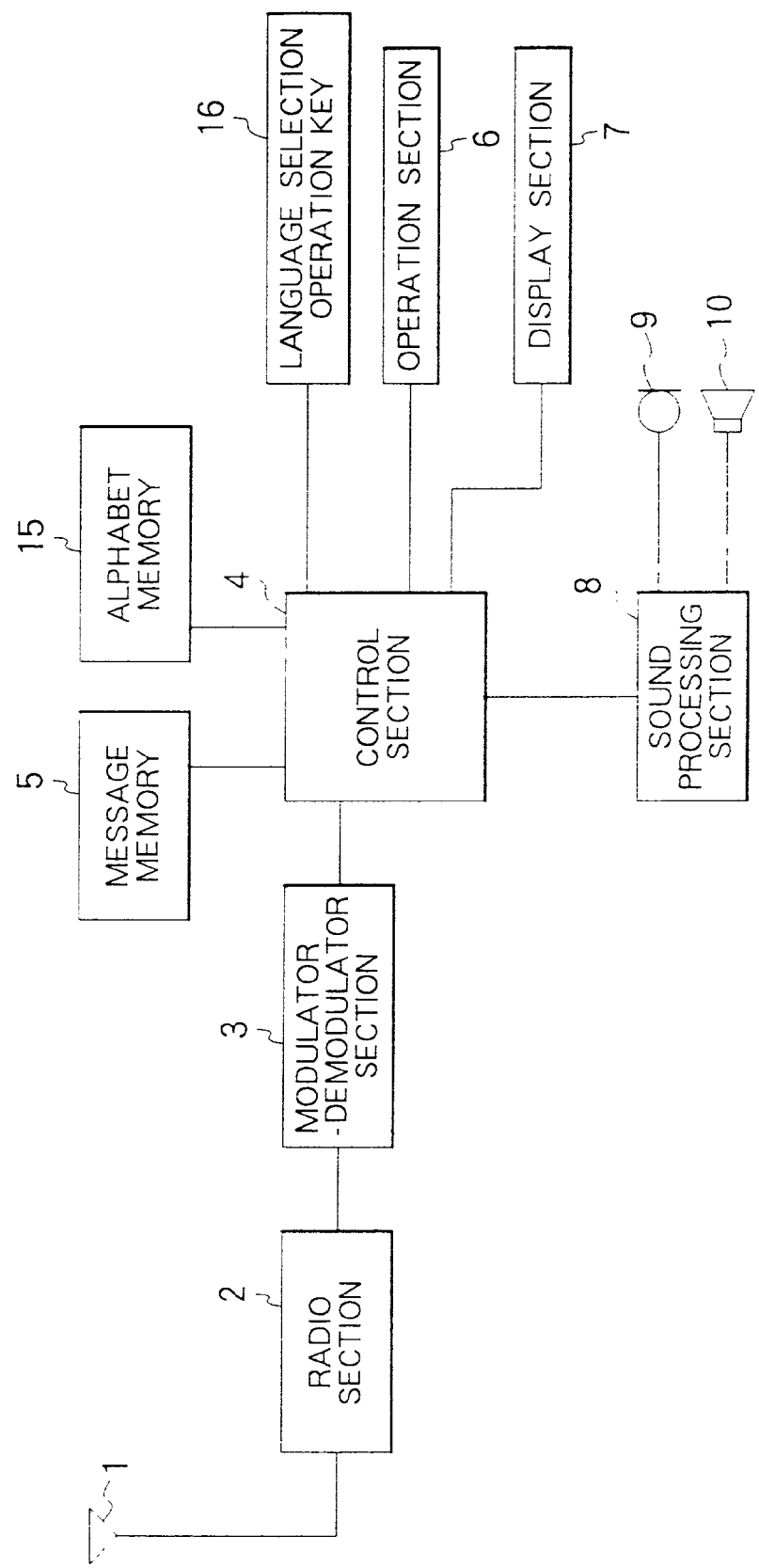
FIG. 5 is a block diagram showing the construction of a portable radio communication apparatus according to Embodiment 3 of the present invention.

The construction of Embodiment 3 of the present invention will now be described with reference to FIG. 5. FIG. 5 is a block diagram showing the construction of Embodiment 3 of the present invention.

Referring to FIG. 5, a portable radio communication apparatus according to Embodiment 3 comprises: an antenna 1; a radio section 2; a modulator-demodulator section 3; a control section 4; a message memory 5; an operation section 6; a display section 7; a sound processing section 8; a microphone 9; a speaker 10; an alphabet memory 15 formed of a ROM or the like storing a multi-lingual alphabet; and a language selection operation key 16.

The above operation section 6 includes a function key section 6a, a 10-key section 6b and a volume key 6c. The above described language selection key 16 may be provided as an addition, for example, to the function key section 6a.

In the conventional apparatus, since only the keys for the English alphabet such as the 10-key section 6b shown in FIG. 20 are provided, its operation may be effected only in the English language. In areas such as Europe where a multiple of languages are used, however, a different alphabetical notation exists for each language and its selection is required. Provided thus in Embodiment 3 are the alphabet memory 15 storing a multi-lingual alphabet for the languages of French, German, Russian, Italian, Greek and Latin, and the language selection operation key 16. It is thereby possible to readily select any of a plurality of languages.

Figure 6:
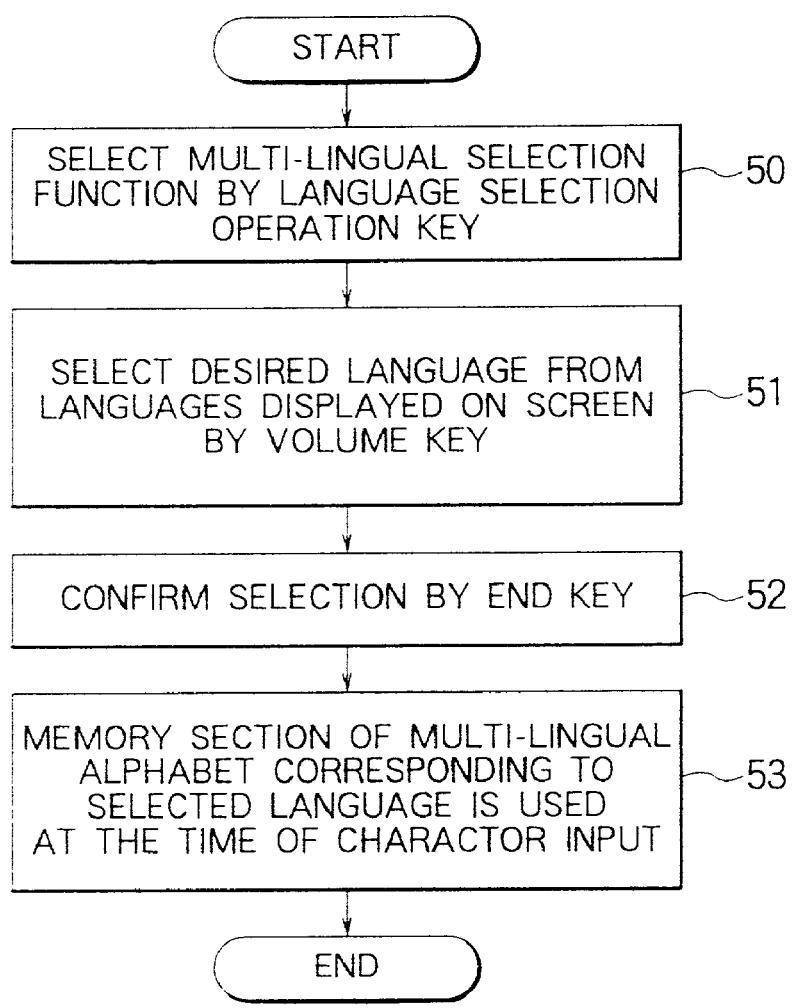
FIG. 6 is a flowchart showing the operation of Embodiment 3 of the present invention.

Operation of Embodiment 3 will be described below with reference to FIG. 6.

At step 50, the control section 4 selects "multi-lingual selection function" upon an operation of the language selection operation key 16. At step 51, the control section 4 then selects by an operation of the volume key 6c the name of a selected language from the names of languages displayed on the screen of the display section 7 as "French, German, Russian, Italian, Greek, Latin". It is also possible that selection be made by an operation of the language selection operation key 16.

Next, at step 52, the control section 4 confirms the selection by an operation of the END key. At step 53, the section of memory corresponding to the selected language of the alphabet memory 15 storing the multi-lingual alphabet is to be used at the time of inputting by character. In other words, when, for example, the Greek language (character) is selected and the numeral key "1" is pressed once, an "α" is displayed on the display section 7 instead of an "A".

Since, with Embodiment 3, one of the alphabets of a plurality of languages may be selected, a language other than the English language may be used. It should be noted that, instead of additionally providing the language selection operation key 16, a combination of existing keys may be used as the language selection operation key. For example, the language selection operation key may be formed by a combination of FCN key and numeral keys.

Embodiment 4

Figure 7:
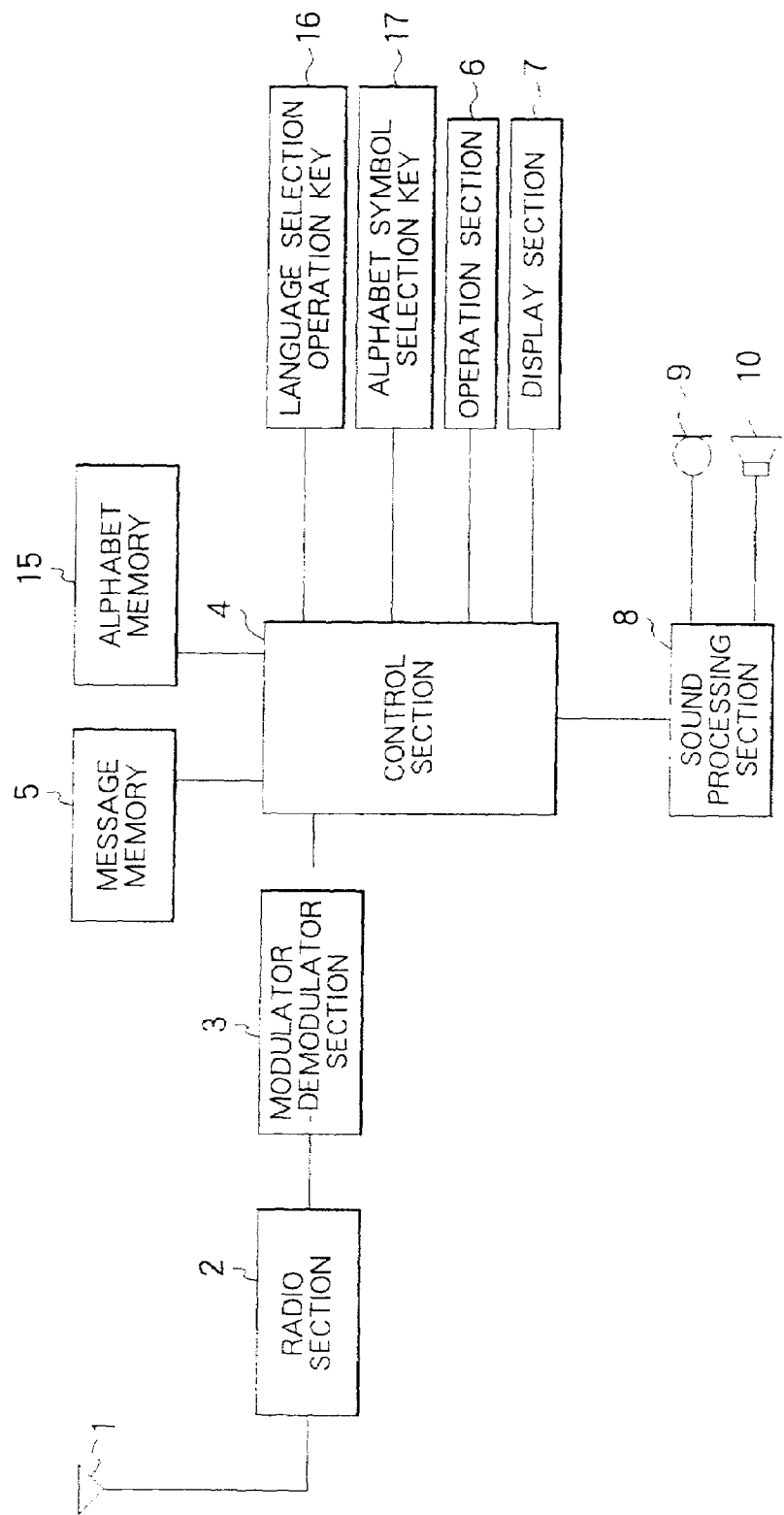
FIG. 7 is a block diagram showing the construction of a portable radio communication apparatus according to Embodiment 4 of the present invention.

The construction of Embodiment 4 of the present invention will now be described with reference to FIG. 7. FIG. 7 is a block diagram showing the construction of Embodiment 4 of the present invention.

Referring to FIG. 7, a portable radio communication apparatus according to Embodiment 4 comprises: an antenna 1; a radio section 2; a modulator-demodulator section 3; a control section 4; a message memory 5; an operation section 6; a display section 7; a sound processing section 8; a microphone 9; a speaker 10; an alphabet memory 15 formed of a ROM or the like storing a multi-lingual alphabet; a language selection operation key 16; and an alphabet symbol selection key 17.

The above operation section 6 includes a function key section 6a, a 10-key section 6b and a volume key 6c. The above described language selection key 16 and alphabet symbol selection key 17 may be provided as additions, for example, to the function key section 6a.

In Embodiment 4, in order to facilitate not only the language selection but also the selection of characters of the selected language, the alphabet symbol selection key 17 is provided to make possible a peculiar character selection for each language.

Figure 8:
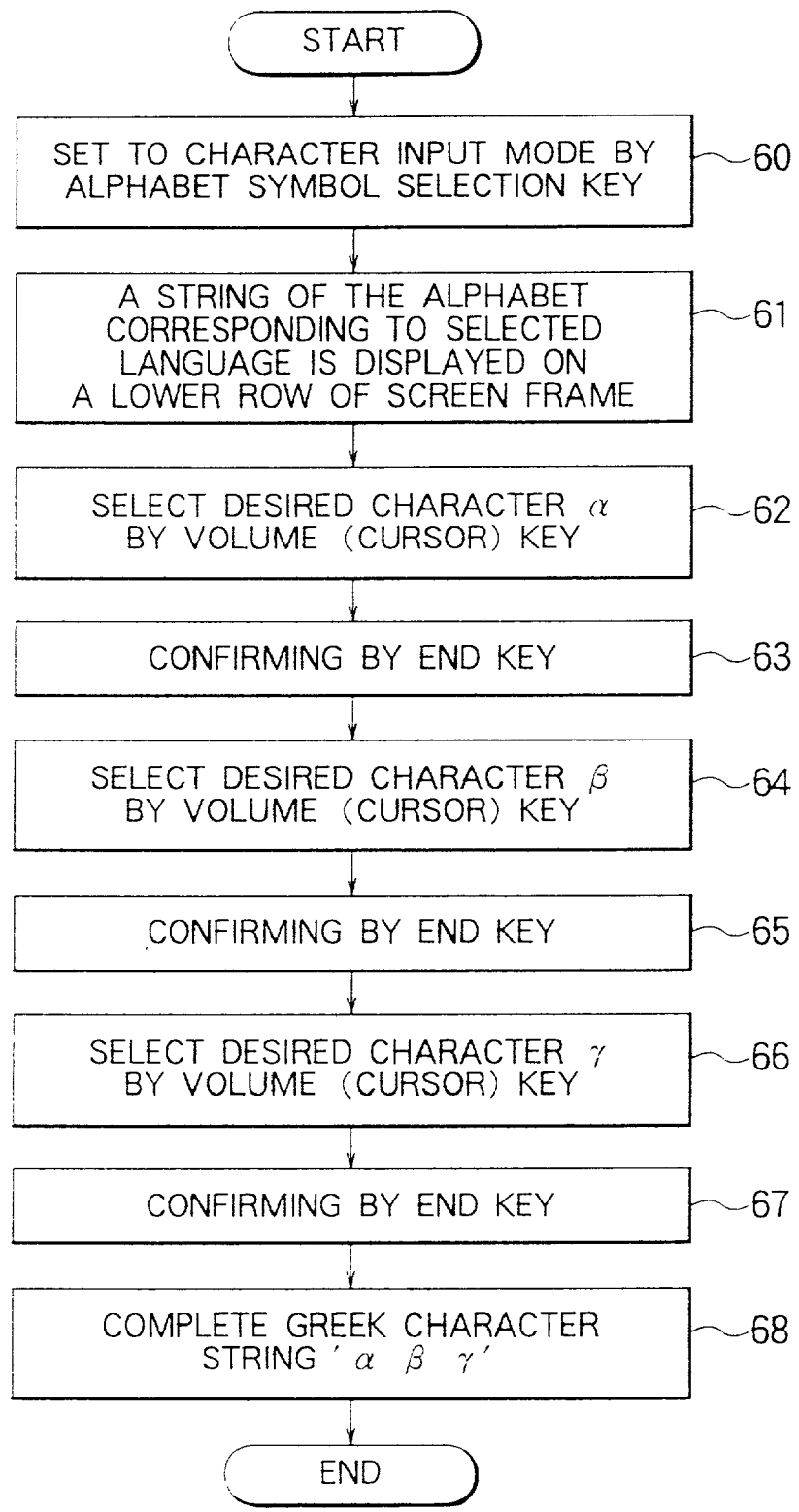
FIG. 8 is a flowchart showing the operation of Embodiment 4 of the present invention.

Operation of Embodiment 4 will now be described with reference to FIG. 8. A case will be described below for example of forming a Greek character string "α β γ".

At step 60, the control section 4 selects a desired language such as the Greek language by an operation of the language selection operation key 16 and then enters "character input mode" by an operation of the alphabet symbol selection key 17. Next, at step 61, the control section 4 displays a character string such as "α β γ . . . " corresponding to the selected language in a row at the lower portion of the screen frame of the display section 7. Next, at step 62, a desired character "α" is selected by an operation of the volume key (cursor key) 6c. Next, at step 63, the control section 4 confirms this by an operation of the END key.

Similarly, in steps 64 to 68, the control section 4 selects a desired character "β" by an operation of the volume key 6c and confirms it by an operation of the END key. Further, the control section 4 selects a desired character "γ" by an operation of the volume key 6c and confirms it by an operation of the END key. A Greek character string "α β γ" is thus complete. In this manner, characters may be readily selected to form a word or message.

In Embodiment 4, a message of a language other than the English language may readily be formed. It should be noted that, instead of additionally providing the language selection operation key 16 and alphabet symbol selection key 17, a combination of existing keys may be used as the language selection operation key and alphabet symbol selection key. For example, the language selection operation key and alphabet symbol selection key may be formed by a combination of FCN key and numeral keys.

Embodiment 5

Figure 9:
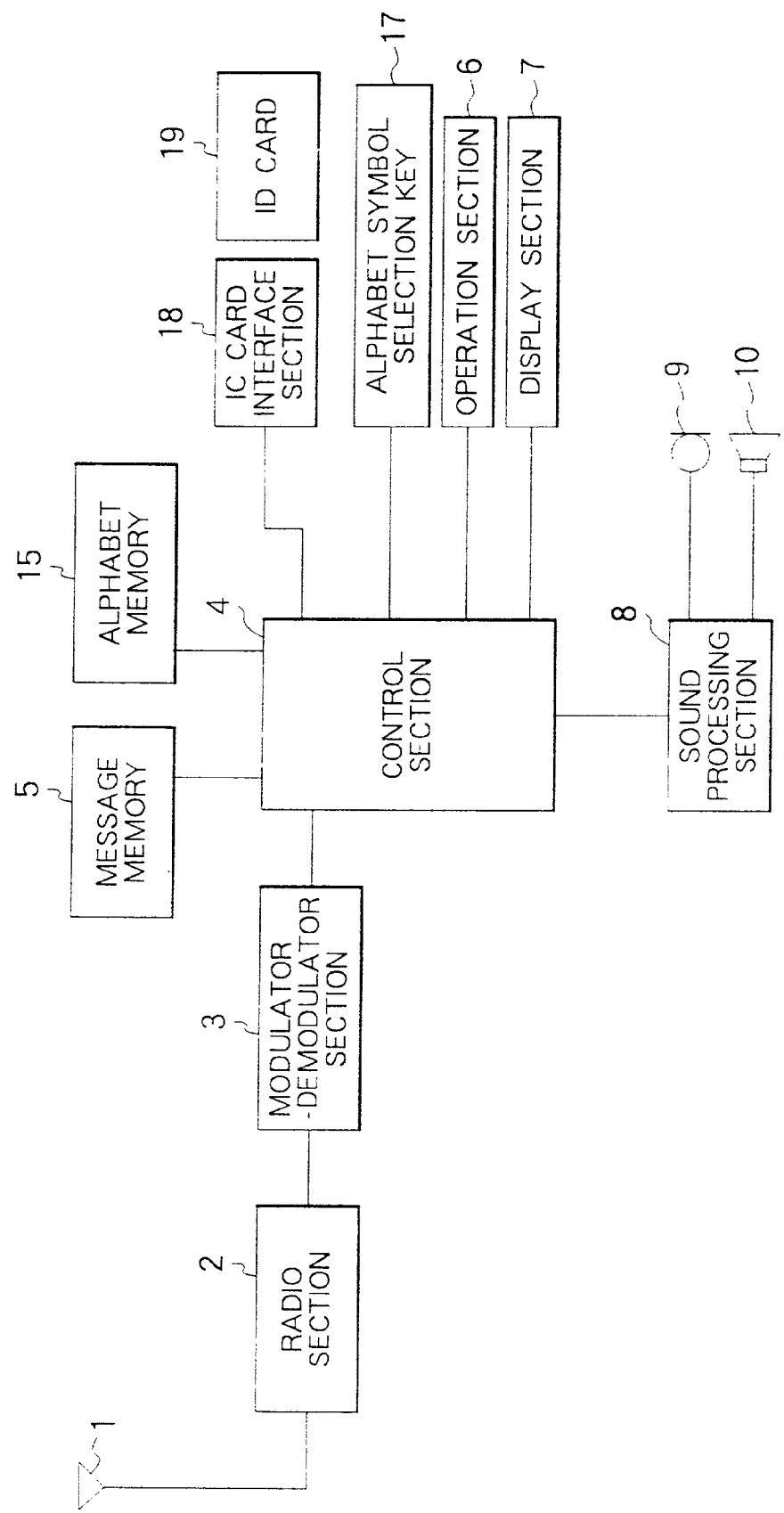
FIG. 9 is a block diagram showing the construction of a portable radio communication apparatus according to Embodiment 5 of the present invention.

The construction of Embodiment 5 of the present invention will now be described with reference to FIG. 9. FIG. 9 is a block diagram showing the construction of Embodiment 5 of the present invention.

Referring to FIG. 9, a portable radio communication apparatus according to Embodiment 5 comprises: an antenna 1; a radio section 2; a modulator-demodulator section 3; a control section 4; a message memory 5; an operation section 6; a display section 7; a sound processing section 8; a microphone 9; a speaker 10; an alphabet memory 15 formed of a ROM or the like storing a multi-lingual alphabet; an alphabet symbol selection key 17; and an IC card interface section 18 capable of mounting an ID card 19 such as an IC card.

The above operation section 6 includes a function key section 6a, a 10-key section 6b and a volume key 6c. The above described alphabet symbol selection key 17 may be provided as an addition, for example, to the function key section 6a. Further, the above described IC card interface section 18 may be provided for example on a side or back surface of the apparatus.

In a system such as GSM using the subscriber ID card 19 in which its home system is recorded, it is possible to automatically select a language based on the nationality of such home system. Therefore, in Embodiment 5, the IC card interface 18 is provided on the apparatus.

Figure 10:
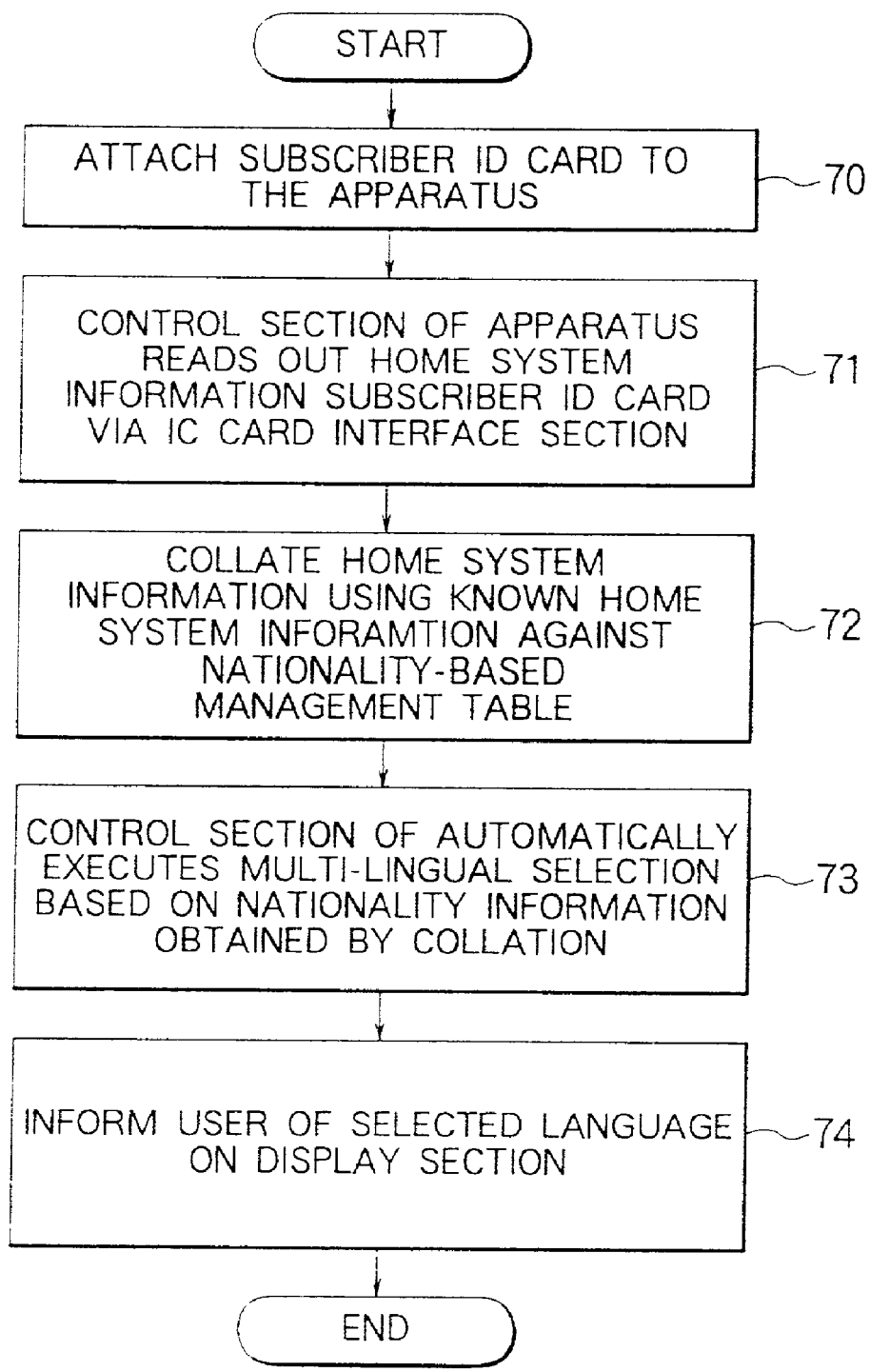
FIG. 10 is a flowchart showing the operation of Embodiment 5 of the present invention.

Operation of Embodiment 5 will now be described with reference to FIG. 10.

In steps 70 to 71, when the subscriber ID card 19 has been mounted to the IC card interface section 18, the control section 4 reads out a home system information within the subscriber ID card 19 through the IC card interface section 18.

Next, at step 72, the control section 4 collates the read home system information by a known home system information versus a nationality management table which is located within an internal memory. Next, at step 73, the control section 4 automatically executes a language selection based on the nationality information obtained by the collation. The control section 4 then informs the user by the display section 7 of the selected language. If, for example, the nationality information is related to Greek, the fact that the Greek language has been selected is displayed on the display section 7. Accordingly, the language of the user who owns the ID card 19 is automatically selected, thereby achieving simpler operation and easier handling of the apparatus.

In Embodiment 5, since a desired language is automatically selected, selecting operation of the language is unnecessary and it is easy to form a message in a desired language.

Embodiment 6

Figure 11:
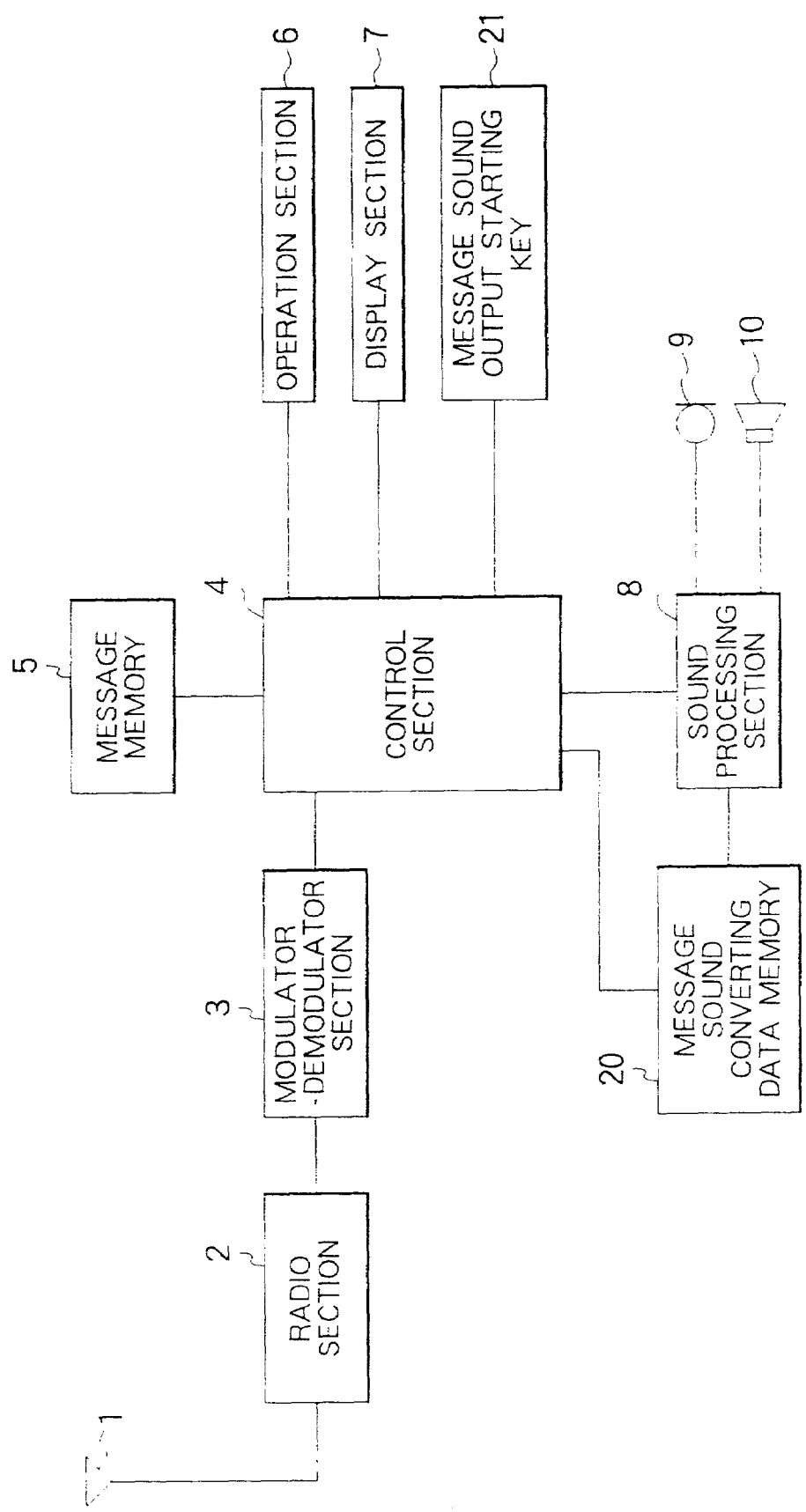
FIG. 11 is a block diagram showing the construction of a portable radio communication apparatus according to Embodiment 6 of the present invention.

The construction of Embodiment 6 of the present invention will now be described with reference to FIG. 11. FIG. 11 is a block diagram showing the construction of Embodiment 6 of the present invention.

Referring to FIG. 11, a portable radio communication apparatus according to Embodiment 6 comprises: an antenna 1; a radio section 2; a modulator-demodulator section 3; a control section 4; a message memory 5; an operation section 6; a display section 7; a sound processing section 8; a microphone 9; a speaker 10; a message sound converting data memory 20 for storing necessary information for converting a received message into a sound; and a message sound output starting key 21.

The above operation section 6 includes a function key section 6a, a 10-key section 6b and a volume key 6c. The above described message sound output starting key 21 may be provided as an addition, for example, to the function key section 6a.

If the number of characters which may be displayed on the display section 7 is small, it may be difficult to comprehend a received message. In other words, if the received message is longer than the number of characters which may be displayed on the display section 7, for example, when the received message consists of 160 characters while the display section is of 20 characters, it is impossible to read the entire message without scrolling the screen. Thus, in Embodiment 6, the message sound converting data memory 20 is connected to the control section 4 and the sound processing section 8.

Accordingly, the control section 4, upon an operation of the message sound output starting key 21, provides notation data of the received message stored in the message memory 5 to the message sound converting data memory 20. Thereby, as each notation data is converted into a sound data and is delivered to the sound processing section 8, it is reproduced as a sound message from the speaker 10. It is thus easy to know the content of the received message even when it is a long message.

Figure 12:
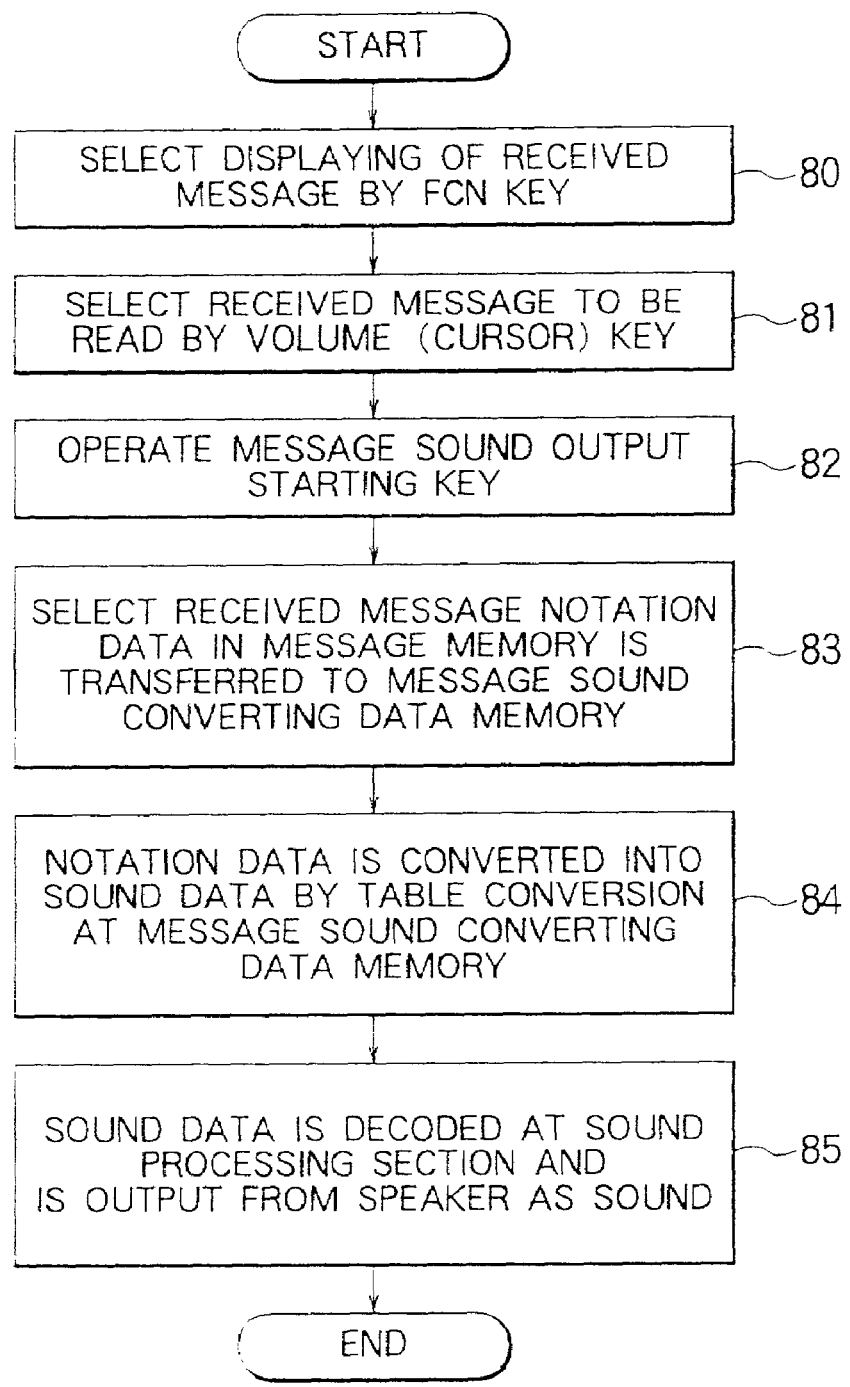
FIG. 12 is a flowchart showing the operation of Embodiment 6 of the present invention.

Operation of Embodiment 6 will now be described with reference to FIG. 12.

At step 80, the control section 4 selects "display received message" by an operation of the FCN key. Next, at step 81, the control section 4 selects the received message to be read out from the message memory 5 by an operation of the volume key 6c. Next, in steps 82 to 83, the control section 4, upon an operation of the message sound output starting key 21, transfers notation data of the selected received message within the message memory 5 to the message sound converting data memory 20.

At step 84, the control section 4 converts the notational data into a sound data by means of table conversion at the message sound converting data memory 20. Next, at step 85, the sound data is decoded by the sound processing section 8 and is output from the speaker 10 as a sound.

Embodiment 7

Figure 13:
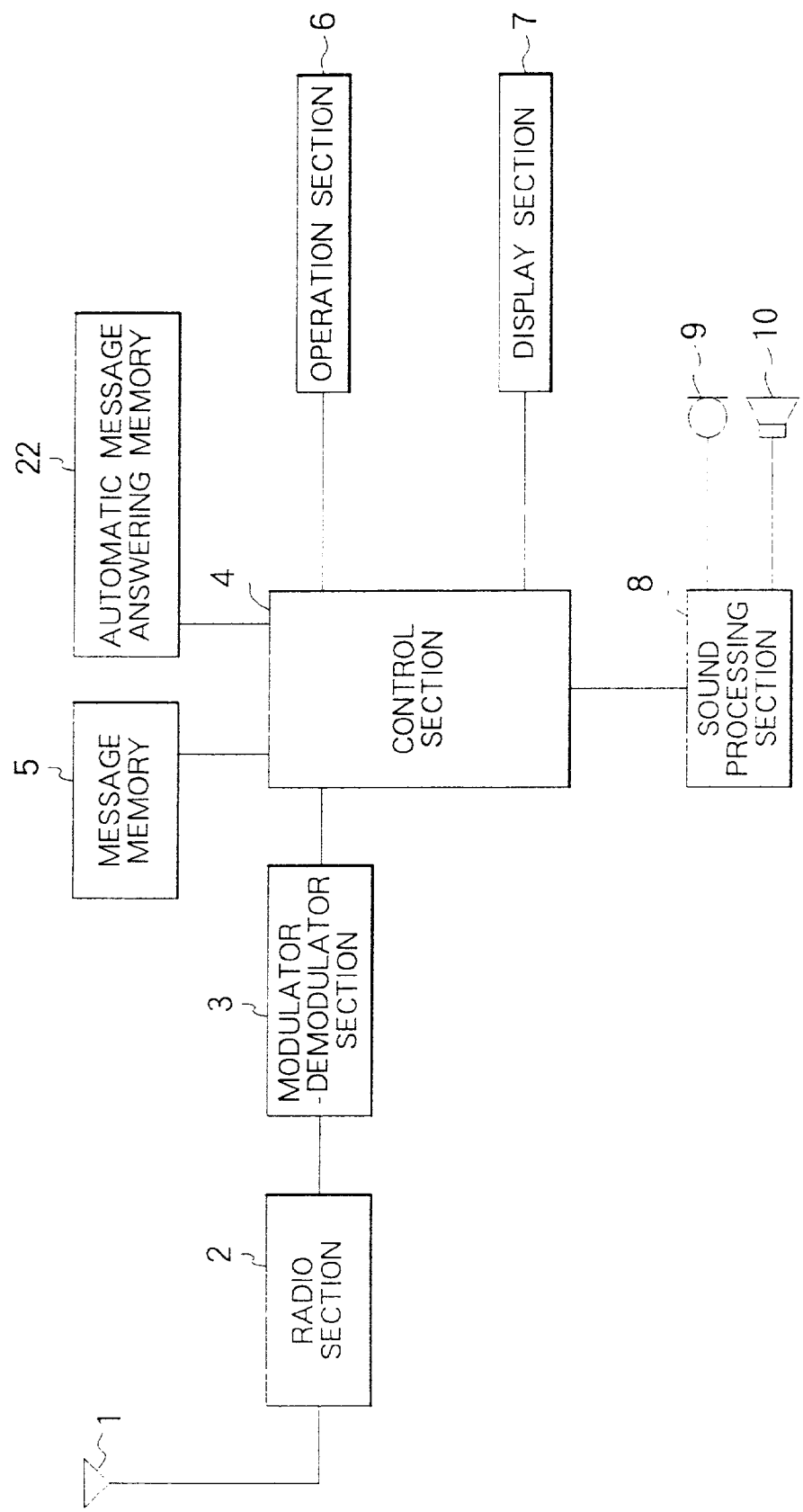
FIG. 13 is a block diagram showing the construction of a portable radio communication apparatus according to Embodiment 7 of the present invention.

The construction of Embodiment 7 of the present invention will now be described with reference to FIG. 13. FIG. 13 is a block diagram showing the construction of Embodiment 7 of the present invention.

Referring to FIG. 13, a portable radio communication apparatus according to Embodiment 7 comprises: an antenna 1; a radio section 2; a modulator-demodulator section 3; a control section 4; a message memory 5; an operation section 6; a display section 7; a sound processing section 8; a microphone 9; a speaker 10; and an automatic answering message memory 22 formed of RAM or the like and storing answering message and/or address for transfer.

The above operation section 6 includes a function key section 6a, a 10-key section 6b and a volume key 6c.

If a message has been automatically received in case of users absence, no response will be made to the party at the other end of communication though the received message is stored to the message memory 5. Thus, in Embodiment 7, the automatic answering message memory 22 is provided, which stores answering message and/or transfer address corresponding to ID.

If a match occurs upon a collation between the ID in a received message and a destination ID for each answering message stored in the automatic answering message memory 22, the control section 4 automatically answers by reading out the answering message. Further, by storing a transfer address to the automatic answering message memory 22 instead of an answering message, the received message may be automatically transferred.

Figure 14:
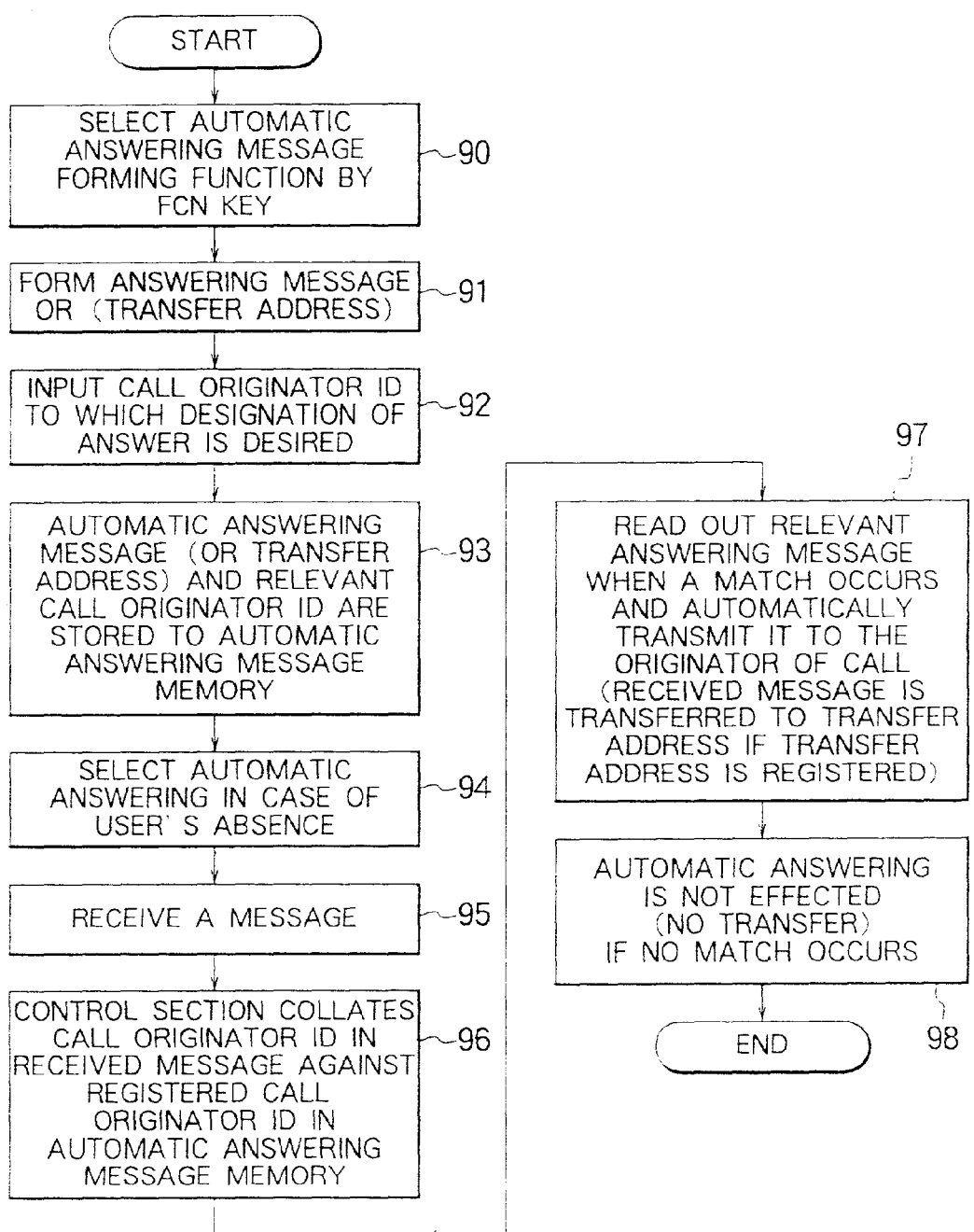
FIG. 14 is a flowchart showing the operation of Embodiment 7 of the present invention.

Operation of Embodiment 7 of the present invention will now be described with reference to FIG. 14.

At step 90, upon an operation of the FCN key, the control section 4 selects "automatic answering message forming function". Next, at step 91, the control section 4 forms an answering message or transfer address by an operation of the numeral keys, etc. Next, at step 92, by an operation of the numeral keys, etc., the control section 4 inputs a registered call originator ID to which a designated answering is desired. Next, at step 93, the control section 4 stores the formed answering message or transfer address and the relevant registered call originator ID to the automatic answering message memory 22 by an operation of the END key.

At step 94, upon an operation of the FCN key, the control section 4 selects "automatic answering in case of users absence" by which an automatic response is made when the user is absent. Next, in steps 95 to 96, upon receiving a message, the control section 4 collates the call originator ID in the received message with the registered call originator ID in the automatic answering message memory 22.

At step 97, if the IDs match each other, the control section 4 reads out the relevant answering message from the automatic answering message memory 22 and automatically transmits it to the originating party of the above message. Alternatively, if the transfer address is registered, the control section 4 transfers the received message to the transfer address.

At step 98, if the IDs do not match, the control section 4 does not effect an automatic answering. Also, no transferring will be made.

In Embodiment 7, since an answering message and call originator ID to which the answering is designated are stored to the automatic answering message memory 22, it is possible in case of users absence to respond to the party at the other end of communication. Further, since a transfer address and call originator ID for designating an answering operation are stored to the automatic answering message memory 22, the user of the apparatus is able to know the content of a message even when he/she is absent.

Embodiment 8

Figure 15:
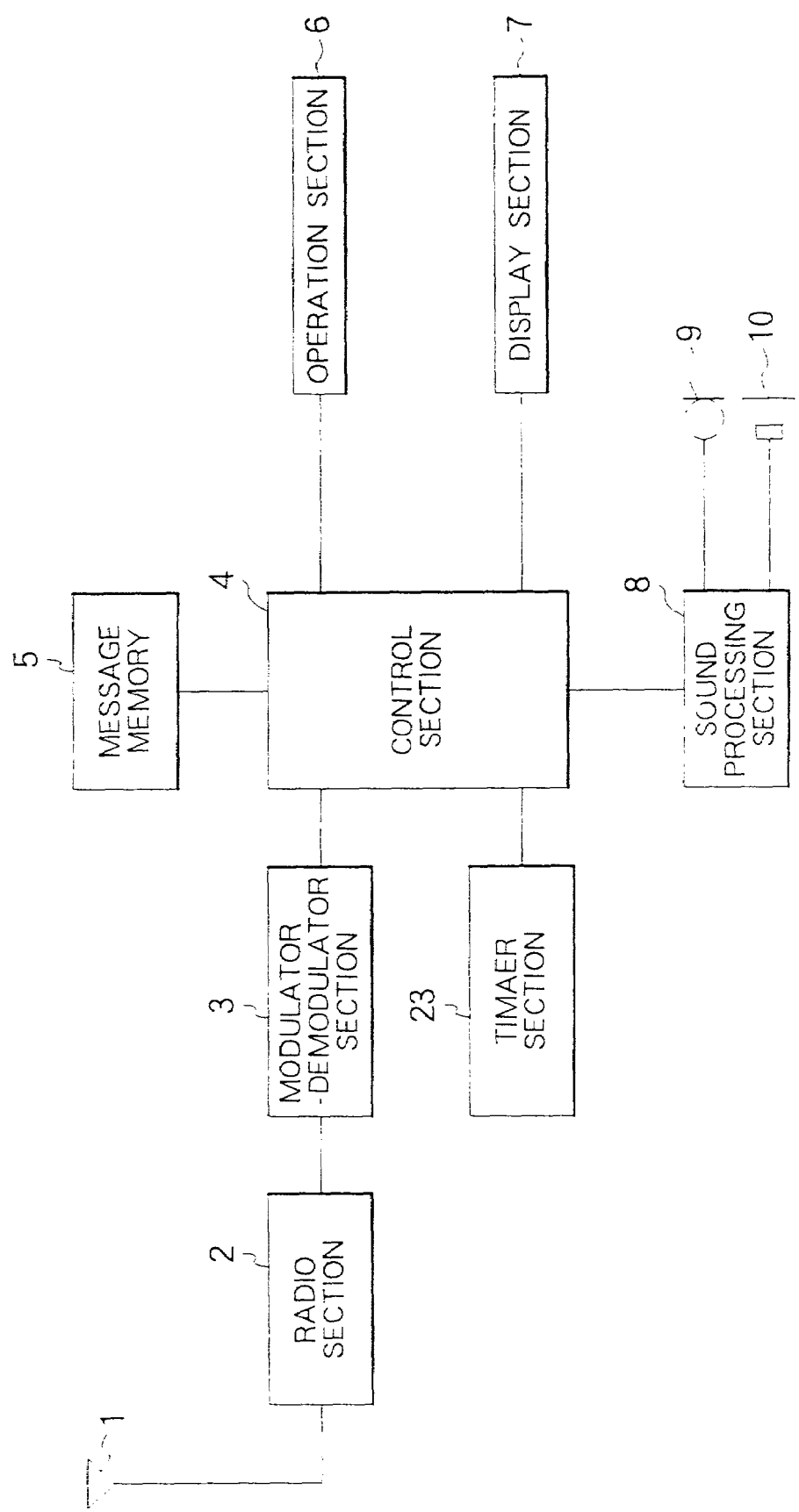
FIG. 15 is a block diagram showing the construction of a portable radio communication apparatus according to Embodiment 8 of the present invention.

The construction of Embodiment 8 of the present invention will now be described with reference to FIG. 15. FIG. 15 is a block diagram showing the construction of Embodiment 8 of the present invention.

Referring to FIG. 15, a portable radio communication apparatus according to Embodiment 8 comprises: an antenna 1; a radio section 2; a modulator-demodulator section 3; a control section 4; a message memory 5; an operation section 6; a display section 7; a sound processing section 8; a microphone 9; a speaker 10; and a timer section 23 for measuring the current time.

The above operation section 6 includes a function key section 6a, a 10-key section 6b and a volume key 6c.

In Embodiment 8, by providing the timer section 23, it is possible to record a received message together with its reception time, to automatically insert time of transmitting operation into the transmitting message and/or to automatically transmit it at a certain point in time.

Figure 16:
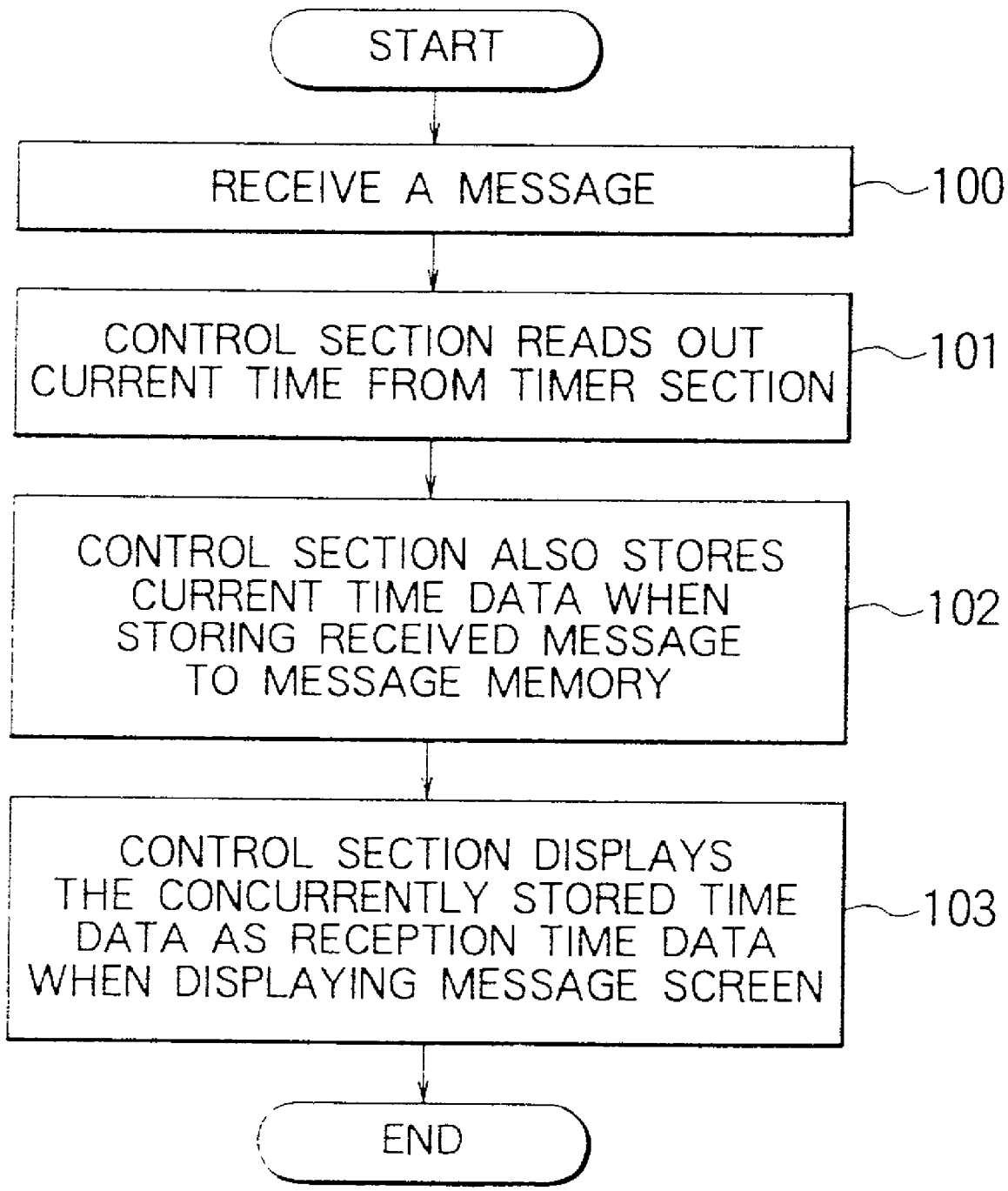
FIG. 16 is a flowchart showing the operation at the time of receiving of Embodiment 8 of the present invention.
Figure 17:
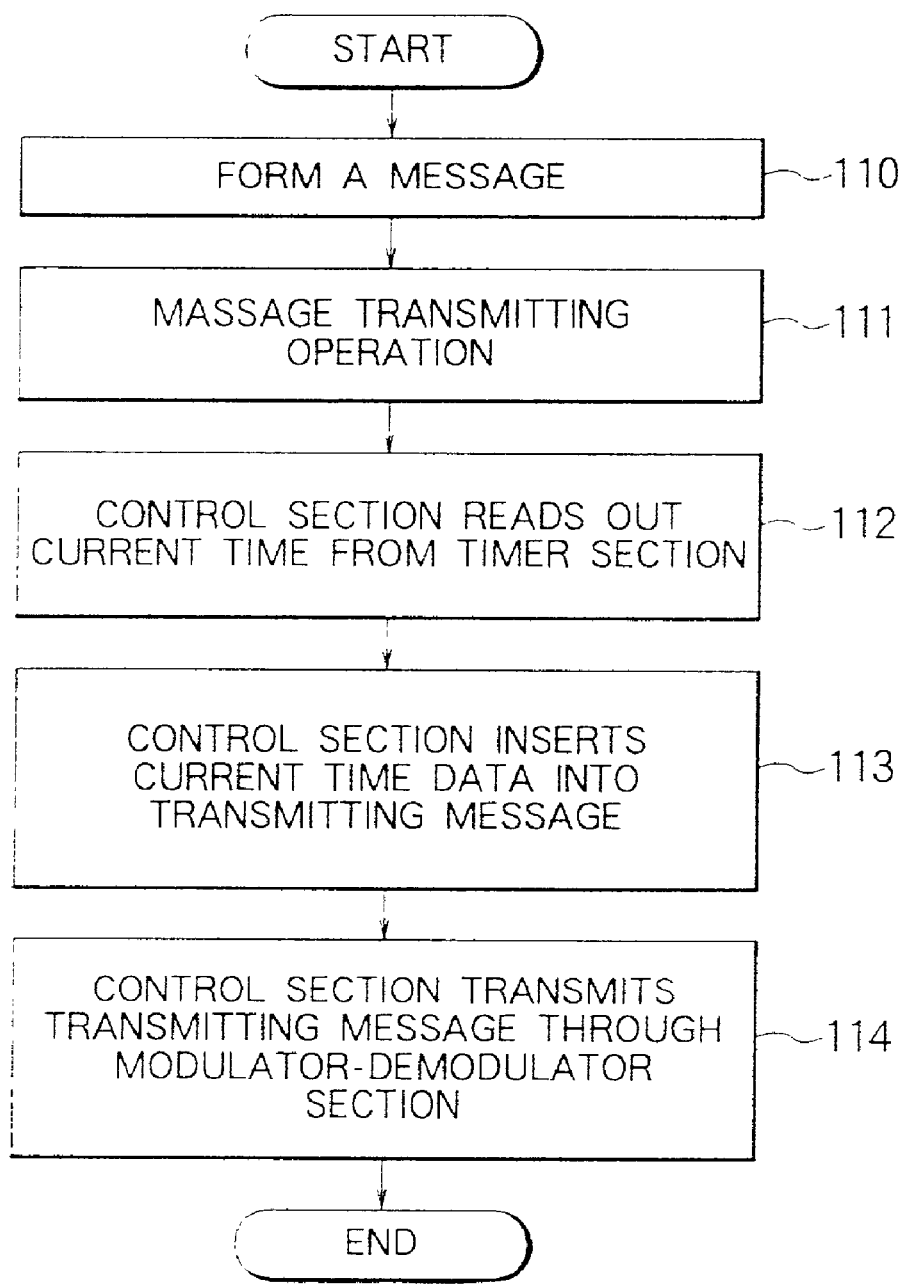
FIG. 17 is a flowchart showing the operation at the time of transmitting of Embodiment 8 of the present invention.
Figure 18:
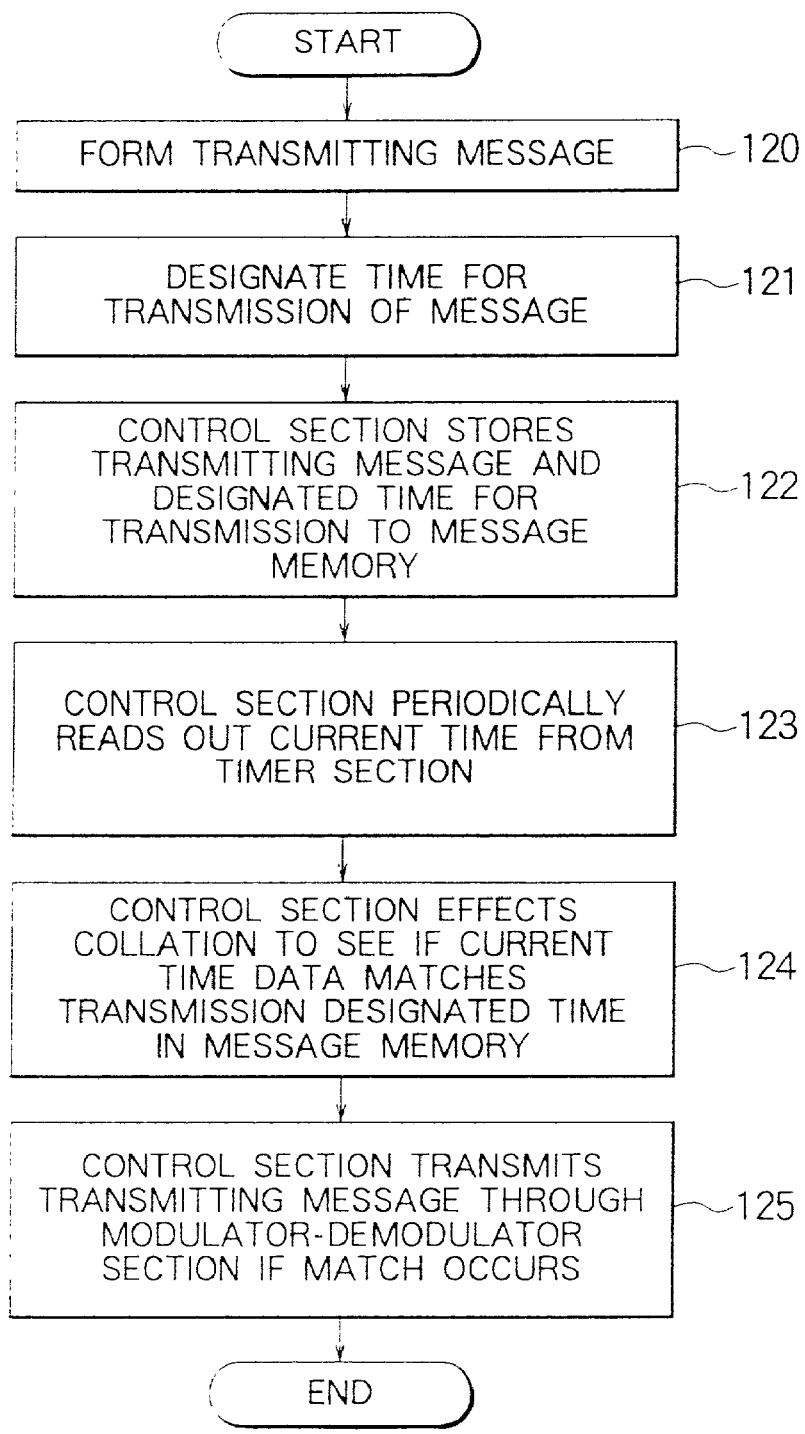
FIG. 18 is a flowchart showing the operation at the time of transmitting of Embodiment 8 of the present invention.
Figure 19:
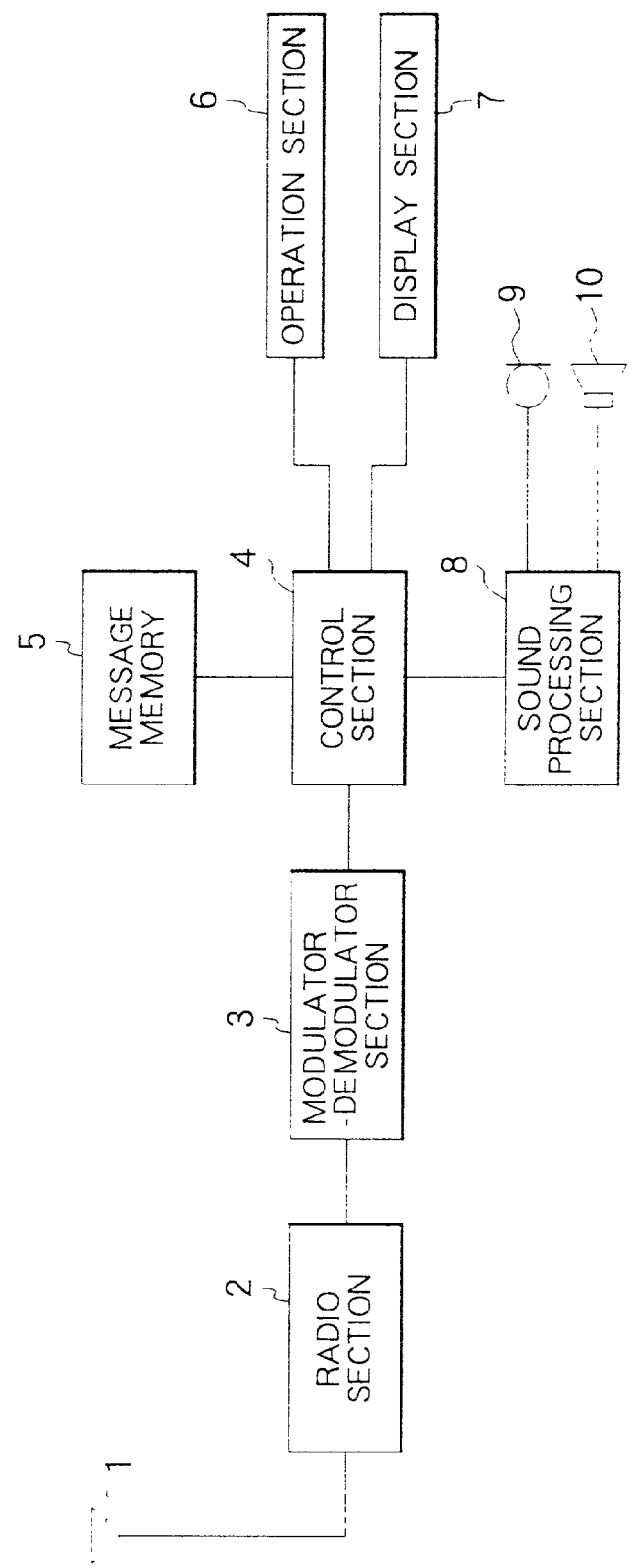
FIG. 19 is a block diagram showing the construction of a conventional portable radio communication apparatus.

Operation of Embodiment 8 of the present invention will now be described with reference to FIGS. 16 to 18.

First, the case will be described below of recording the received message together with its reception time.

In steps 100 to 101, upon a reception of message, the control section 4 reads out the current time from the timer section 23. Next, at step 102, the control section 4 concurrently stores the above read out current time when storing the received message to the message memory 5. Next, at step 103, the control section 4 displays the concurrently stored current time data as a reception time data when displaying the received message on the screen of the display section 7. Accordingly, the reception time of a received message may readily be seen and recorded.

Next, the case will be described below of automatically inserting the time of transmitting operation into a transmitting message.

In steps 110 to 114, the control section 4 forms a message by an operation of the FCN key, character key, etc., and, upon pressing of the SEND key, it reads the current time out from the timer section 23. Next, the control section 4 inserts the above read out current time data into the transmitting message. The control section 4 then transmits the transmitting message through the modulator-demodulator section 3 and radio section 2. Accordingly, the transmitting time of a transmitting message may readily be seen and recorded.

Further, the case will be described of automatically transmitting a message at a designated time.

In steps 120 to 122, upon operation of the FCN key, numeral (character) keys, etc., the control section 4 forms a transmitting message and at the same time designates a point in time at which the message is to be transmitted. The control section 4 stores to the message memory 5 the transmitting message and the designated time for transmission by an operation of the END key. Next, in steps 123 to 125, the control section 4 periodically reads the current time out from the timer section 23. Next, the control section 4 effects a collation so as see if the read out current time data matches the designated time for transmission in the message memory 5. When a match occurs, it transmits the relevant transmitting message through the modulator-demodulator section 3 and radio section 2. Accordingly, it is possible to prevent a failure in remembering to send a message.

What is claimed is:

1. A portable radio communication apparatus comprising:
an antenna for performing at least one of transmitting or receiving a radio frequency message signal containing a text message;
radio modulator-demodulator means for demodulating a received radio frequency message signal and for modulating a transmitting message signal containing a text message;
message memory means for storing at least one of a transmitted or a received text message;
display means for displaying at least one of said transmitted or received text message;
operation means for forming a text message to be transmitted;
timer means for measuring the current time; and
control means for managing said current time;
wherein said control means is for forming said text message to be transmitted through said operation means, a transmitting text message, storing a designated time for transmission together with the formed text message when storing the formed text message to said message memory means, and transmitting said transmitting text message when a match occurs between the current time read out from said timer means and the designated time for transmission added to said transmitting text message.

2. A portable radio communication apparatus according to claim 1, wherein said control means storing the current time read out from said timer means together with a received text message as a reception time data when storing the received text message to said message memory means, and displaying said reception time data when displaying said received text message on said display means.

3. A portable radio communication apparatus according to claim 1, wherein said control means is for forming said text message to be transmitted through said operation means, a transmitting text message, and inserting the current time read out from said timer means into said transmitting text message as a transmitting time data when transmitting said transmitting message.

4. A portable radio communication apparatus according to claim 1, wherein said control means stores the current time read out from said timer means together with the formed transmitting text message by said operation means in said message memory means.

* * * * *